(12) United States Patent
Liu

(10) Patent No.: US 8,248,001 B2
(45) Date of Patent: Aug. 21, 2012

(54) LED CONTROL CIRCUIT AND METHOD, AND INSECT RESISTIVE LED LAMP

(75) Inventor: Jing-Meng Liu, Jubei (TW)

(73) Assignee: Richtek Technology Corp., Hsinchu (TW)

( * ) Notice: Subject to any disclaimer, the term of this patent is extended or adjusted under 35 U.S.C. 154(b) by 651 days.

(21) Appl. No.: 12/382,588

(22) Filed: Mar. 19, 2009

(65) Prior Publication Data

US 2009/0236997 A1     Sep. 24, 2009

(30) Foreign Application Priority Data

Mar. 21, 2008   (TW) ................................ 97110136 A

(51) Int. Cl.
*H05B 37/02*   (2006.01)

(52) U.S. Cl. ........ 315/360; 315/291; 315/306; 315/308; 372/28; 372/30; 372/32; 372/38.02; 327/108; 327/144

(58) Field of Classification Search .................. 315/312, 315/360, 291, 219, 307, 287, 224, 308; 323/282, 323/283, 285, 288, 290; 327/108–110, 117, 327/132, 144; 363/21.17, 21.18, 89, 127; 372/28, 29.02, 30, 32, 38.07, 38.02
See application file for complete search history.

(56) References Cited

U.S. PATENT DOCUMENTS

| | | | |
|---|---|---|---|
| 6,927,607 B2 * | 8/2005 | Choi et al. ..................... | 327/108 |
| 6,979,987 B2 * | 12/2005 | Kernahan et al. ............. | 323/283 |
| 6,987,787 B1 * | 1/2006 | Mick ........................ | 372/29.021 |
| 7,145,295 B1 * | 12/2006 | Lee et al. ....................... | 315/291 |
| 7,196,481 B2 * | 3/2007 | Bushell et al. ................ | 315/291 |
| 7,378,805 B2 * | 5/2008 | Oh et al. ........................ | 315/291 |
| 7,503,675 B2 * | 3/2009 | Demarest et al. ............. | 362/253 |
| 2010/0164394 A1 * | 7/2010 | Liu ............................... | 315/287 |

* cited by examiner

*Primary Examiner* — Haiss Philogene
(74) *Attorney, Agent, or Firm* — Rosenberg, Klein & Lee

(57) ABSTRACT

A LED control circuit and method generate a high frequency clock signal with a fixed duty for a LED driver, to supply a switching current to drive a LED to emit light flashing at a modulated high frequency and with a fixed duty. By controlling the flashing LED light within certain flashing frequency range, the circuit and method allow a LED light source for expelling, confusing or trapping insects but serving only an illuminative or decorative purpose to human eyes, due to the difference between human beings and insects in visual perception of flashing frequencies.

22 Claims, 5 Drawing Sheets

LED CONTROL CIRCUIT AND METHOD, AND INSECT RESISTIVE LED LAMP

FIELD OF THE INVENTION

The present invention is related generally to a LED control circuit and method and, more particularly, to an insect resistive LED lamp.

BACKGROUND OF THE INVENTION

Insects such as flies and mosquitoes pose great hazards to the living quality of human beings, but insecticides, which are the most direct solution to such hazards, are harmful to the human body and environment. Hence, a wide variety of insect resistive products based on the susceptibility of insects to scents, humidity and light are always developed, including, for example, fly catching paper and mosquito killer lamps. Light has enormous ecological effects on insects. Taking fireflies for example, the flashing frequency of their abdominal bioluminescence is depended upon as means for attracting mates and communication in the dark. Many insects can sense much higher flashing frequency than human eyes, and some kind of swing pattern in flashing frequency can make insects nervous and uncomfortable.

Light emitting diode (LED) is a device that emits light when electrically biased in the forward direction of a semiconductor p-n junction, and is characterized by heterogeneous dual-junction and quantum wells. The first commercial red GaAsP LED was offered by General Electric Company in 1962. The luminous flux of the first red LED was 0.11 m/W, or 1/150 times of an ordinary lamp, with an emissive efficiency increasing by one order of magnitude per decade approximately. The recent advent of high power white LEDs in the wake of implementation of blue LEDs and green LEDs heralds gradual transition from decoration to illumination in terms of the purpose of LEDs, paving the way for ultimate replacement of conventional light bulbs by LEDs. In addition to being environmentally friendly and power saving, LED can be turned on and off in high frequency up to over MHz range. Furthermore, there have been plenty of methods for pulse width modulation (PWM) dimming in LED lighting.

SUMMARY OF THE INVENTION

An objective of the present invention is to propose a LED control circuit for expelling, confusing or trapping insects.

Another objective of the present invention is to propose a LED control method for expelling, confusing or trapping insects.

According to the present invention, a LED control circuit for insect resistive includes a clock generator to provide a high frequency clock signal with a fixed duty to a LED driver with, thereby allowing a LED to emit a light flashing at a high frequency and with a fixed duty.

According to the present invention, a LED control method for insect resistive includes generating a high frequency clock signal with a fixed duty for a LED driver, thereby allowing a LED to emit a light flashing at a high frequency and with a fixed duty.

The circuit and method according to the present invention provide a LED light source for expelling, confusing or trapping insects but serving only an illuminative or decorative purpose to human eyes, due to the difference between human beings and insects in visual perception of flashing frequencies.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
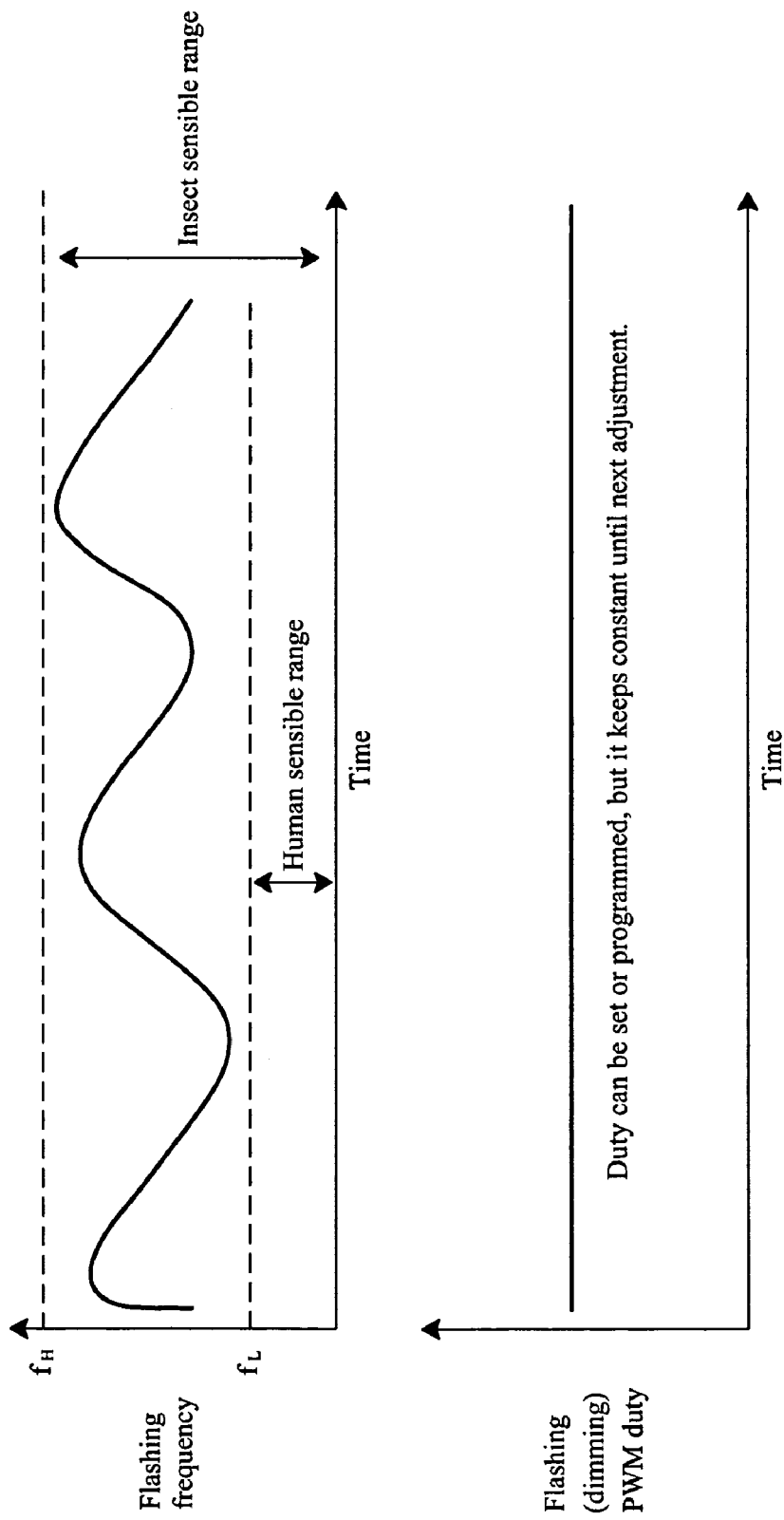
FIG. 1 is a schematic drawing showing the flashing frequencies sensible to human eyes and insects, as well as a flashing mode to be implemented in embodiments of the present invention.

Referring to FIG. 1, given a fixed duty, human eyes can only sense the flashing frequency below $f_L$, and take the average brightness of high frequency flashing as a steady light source. The upper limit $f_L$ of human sensible range in flashing frequencies is generally around 60 Hz but varies from person to person. Above $f_L$, the brightness of the flashing light source is directly proportional to the duty but does not correlate with the flashing frequency. On the other hand, insects discern flashing frequencies up to $f_H$, which is much higher than $f_L$, and this is the reason why the LED control circuit and method according to the present invention can be used for insect resistive. Keeping the flashing frequency range of swings out of the sensible range of human eyes, and keeping the dimming PWM duty the same during the frequency swinging, so that the average brightness is almost the same, and thus this lighting condition is totally equivalent to that of a constant brightness light source when seeing by human eyes, the LED control circuit and method according to the present invention can achieve the purpose of expelling, confusing or trapping insects, without affecting human beings. Preferably, the duty can be set or programmed, but it keeps constant until next adjustment.

Figure 2:
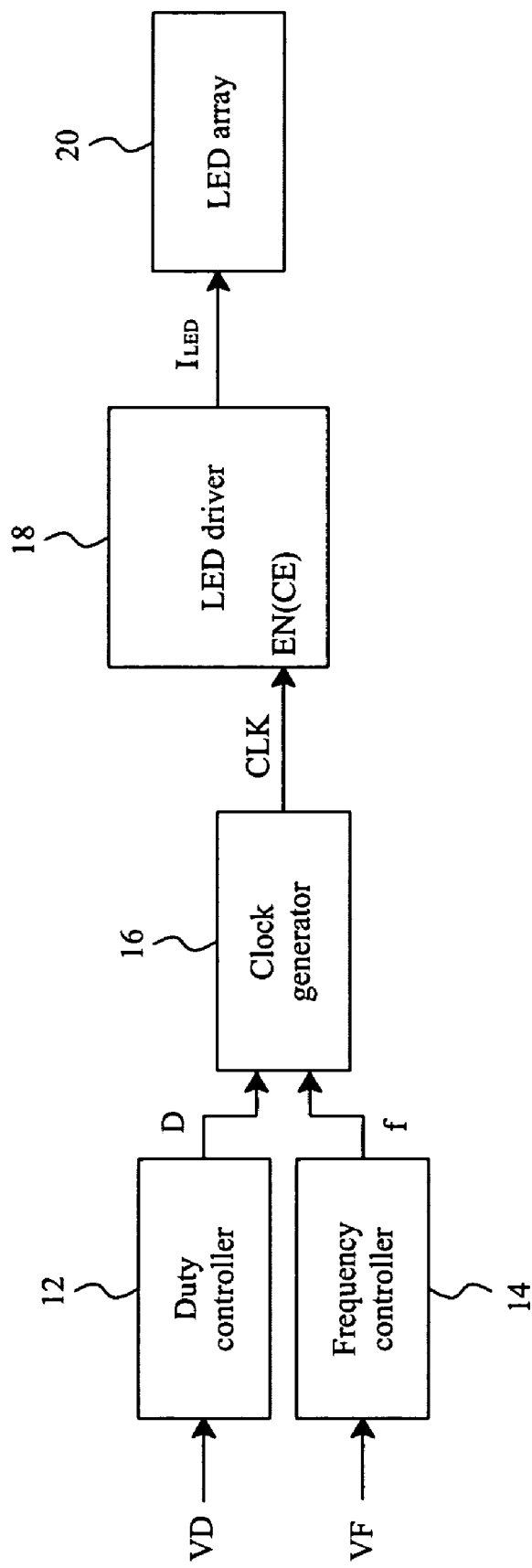
FIG. 2 is a block diagram of a first embodiment according to the present invention.

FIG. 2 illustrates a first embodiment according to the present invention. A duty controller 12 determines a duty D according to a dimming control signal VD, a frequency controller 14 determines a frequency f according to a swing control signal VF, and a clock generator 16 generates a clock signal CLK according to the duty D and the frequency f. The clock signal CLK is sent to an enable input EN or a chip enable input CE of a LED driver 18, and thus the LED driver 18 switches on and off a driving current $I_{LED}$ which is supplied to a LED array 20. As a result, according to the clock signal CLK, the LED array 20 flashes as the driving current $I_{LED}$ is switched on and off. In this embodiment, the dimming control signal VD determines the duty D for switching on and off the driving current $I_{LED}$ and thus determines the brightness of the LEDs in the LED array 20. On the other hand, the swing control signal VF determines the frequency f at which the driving current $I_{LED}$ is switched on and off, and thus determines the flashing frequency of the LEDs in the LED array 20. By setting VD constant, and varying VF with time in a specific mode, the LED lamp of FIG. 2 will produce flashing light characterized as shown in FIG. 1. The duty D for the driving current $I_{LED}$ can be set or programmed by the dimming control signal VD, but keeps constant until it is adjusted. In other words, the brightness of the LED array 20 will be constant at a value unless VD changes. By using the swing control signal VF, the LED array 20 emits flashing light in a certain swing pattern, at the frequency f varying between $f_L$ and $f_H$.

Figure 3:
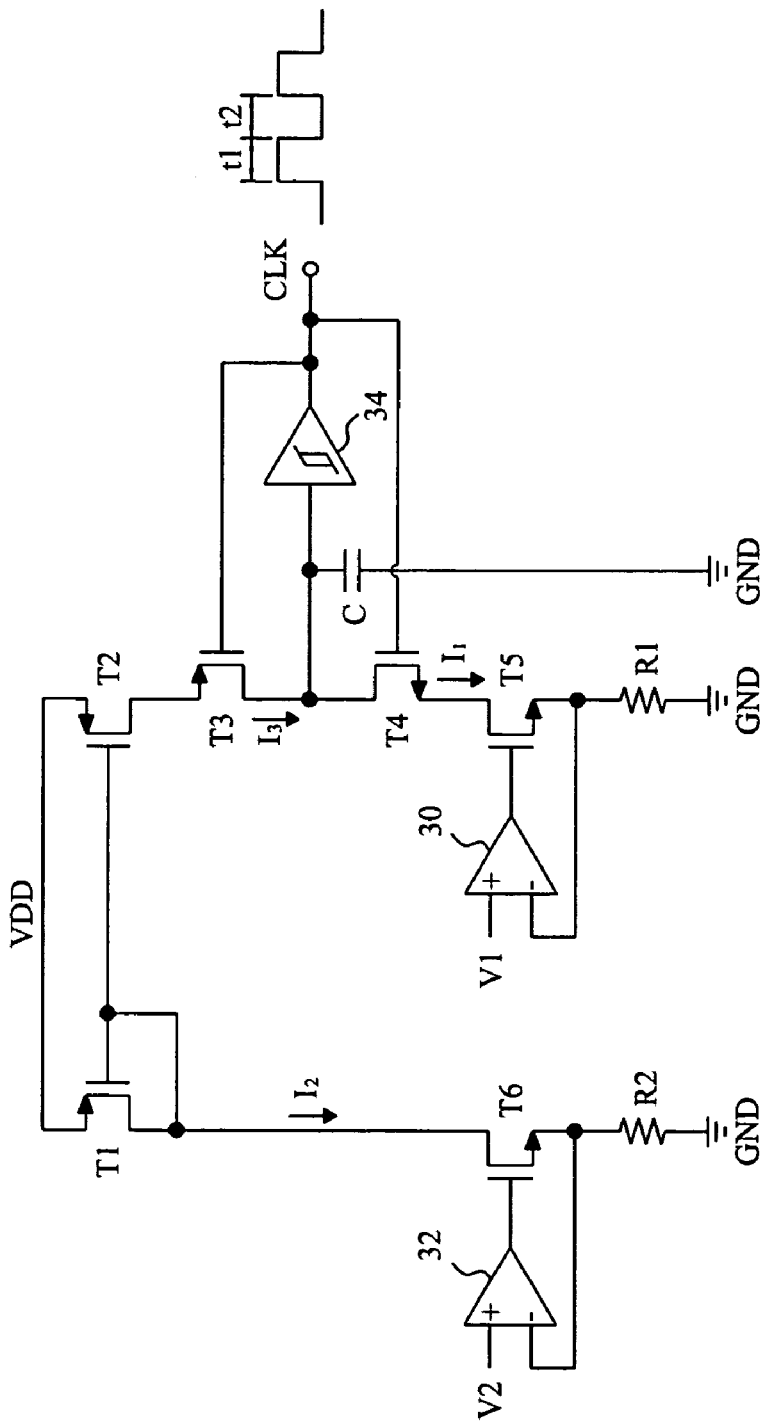
FIG. 3 is a circuit diagram of a second embodiment according to the present invention.

FIG. 3 is a circuit diagram of a second embodiment according to the present invention. The LED driver and LED array in this embodiment are identical to those in the first embodiment of FIG. 2, and are therefore omitted hereof. In the clock generator shown in FIG. 3, the outputs of operational amplifiers 30 and 32 are connected to the gates of transistors T5 and T6 respectively, the negative inputs of the operational amplifiers 30 and 32 are connected to the sources of the transistors T5 and T6 respectively, and voltages V1 and V2 are applied to the positive inputs of the operation amplifiers 30 and 32 respectively, which configure two transducers to transform the voltages V1 and V2 into currents $I_1$ and $I_2$ in transistors T5 and T6, with $I_1=V1/R1$ and $I_2=V2/R2$. Transistors T1 and T2 constitute a current mirror to mirror the current $I_2$, such that the current $I_2$ in the transistor T6 will determine a current $I_3$ in transistor T3 in the current path of the transistor T2. The voltage V2 determines the charging current $I_3$ to a capacitor C, and the voltage V1 determines the discharging current $I_1$ of the capacitor C. A hysteresis circuit, such as a Smith trigger 34, is connected between the capacitor C and the output CLK of this clock generator, triggered by the voltage on the capacitor C so as to generate the clock signal CLK. The clock signal CLK is sent to the LED driver to determine the switching current $I_{LED}$ for the LED array. The on-time and off-time of the clock signal CLK are denoted by t1 and t2 respectively, and thus the duty D and the frequency f of the clock signal CLK will be $$D=t1/(t1+t2)=R1V2/(R1V2+R2V1),$$

and $$f=1/(t1+t2)\propto[(R1/V1)+(R2/V2)]^{-1}.$$

Selecting appropriate voltages V1 and V2 will keep the duty D constant and vary the frequency f between $f_L$ and $f_H$ in a certain swing pattern, and thereby emit LED light flashing at a modulated high frequency with an invariable brightness.

Figure 4:
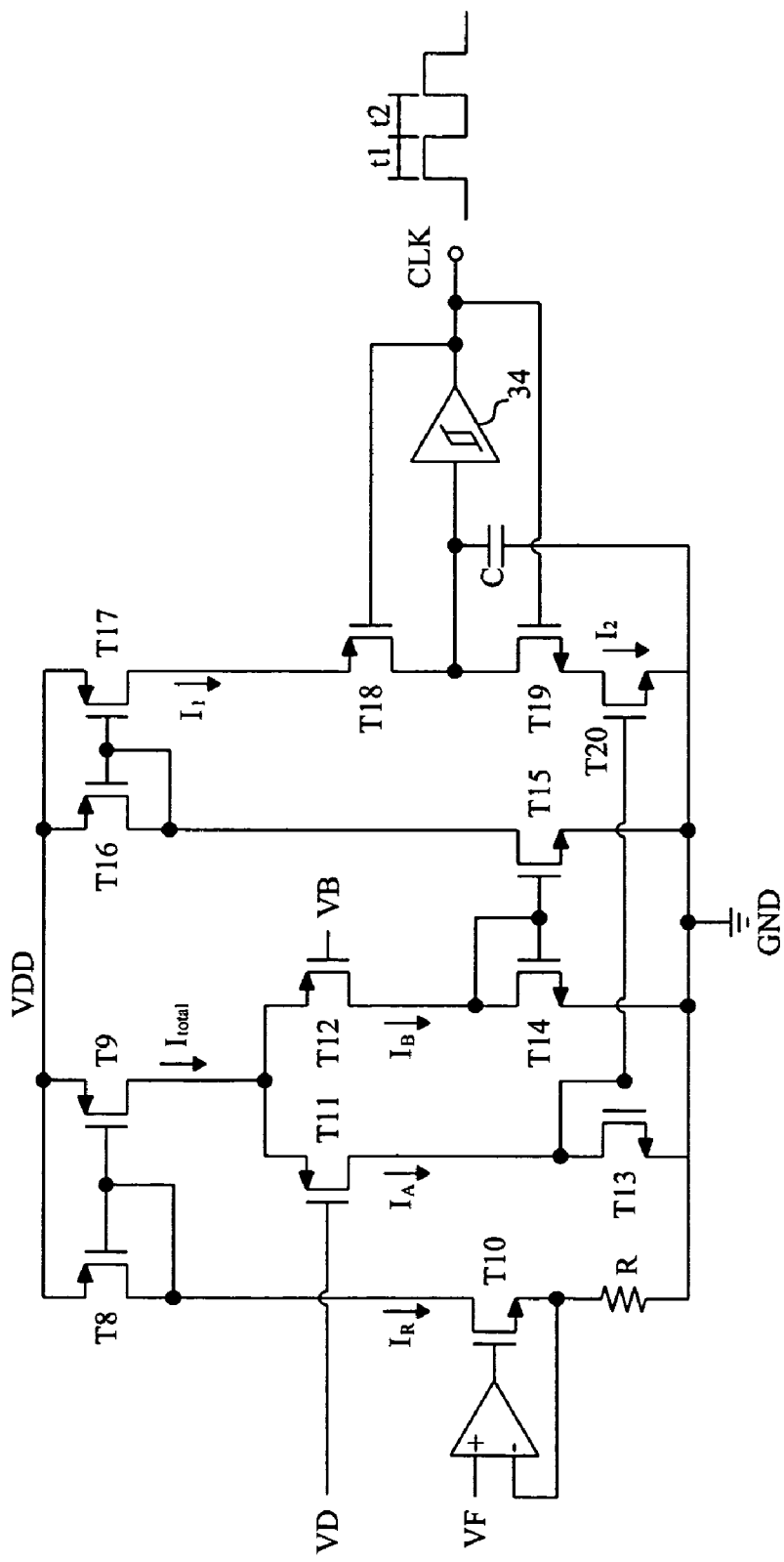
FIG. 4 is a circuit diagram of a third embodiment according to the present invention.

FIG. 4 is a circuit diagram of a third embodiment according to the present invention. The LED driver and LED array in this embodiment are identical to those in the first embodiment of FIG. 2, and are therefore omitted hereof. In the clock generator shown in FIG. 4, transistors T8 and T9, transistors T16 and T17, transistors T14 and T15, and transistors T13 and T20 constitute four current mirrors respectively. Hence, a current $I_R$ proportional to a voltage VF is established by a transducer and a resistor R, and a current $I_{total}$ equal to the current $I_R$ is generated by the current mirror constituted by the transistors T8 and T9. The current $I_{total}$ is divided by transistors T11 and T12 into currents $I_A$ and $I_B$, with the ratio of $I_A$ to $I_B$ determined by voltages VD and VB. In this embodiment, the voltage VB is a fixed reference voltage, and thus the ratio of $I_A$ to $I_B$ is determined by the voltage VD. As a result of current mirroring, a current $I_2$ equal to the current $I_A$, and a current $I_1$ equal to the current $I_B$ are generated. A capacitor C is charged by the current $I_1$ and discharged by the current $I_2$, to produce a voltage thereon to trigger a hysteresis circuit such as a Smith trigger 34. In other words, the total current $I_{total}(=I_A+I_B=I_1+I_2)$ determined by the voltage VF determines the frequency $(t1+t2)^{-1}$ of the clock signal CLK. On the other hand, the voltage VD determines the ratio of $I_1$ to $I_2$ and thereby determines the duty D of the clock signal CLK. Hence, by keeping a fixed difference between the voltages VD and VB, and varying the voltage VF, the clock signal CLK will have a fixed duty and a variable frequency, so as to emit LED light flashing at a modulated high frequency, with a fixed brightness.

In other embodiments, it is feasible to allow a LED light source to flash at a frequency that changes in a specific way according to habits of specific insects.

Figure 5:
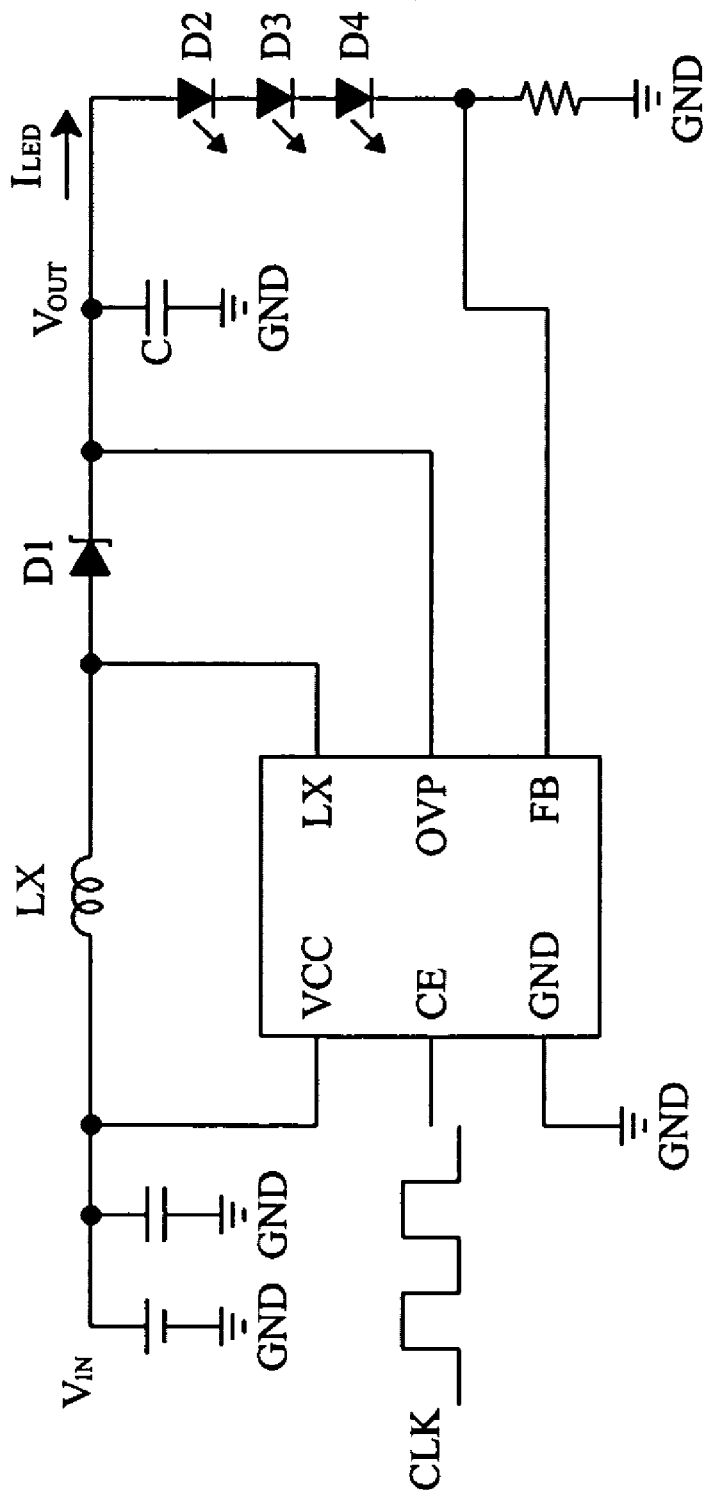
FIG. 5 is a schematic view of an example of a LED driver.

FIG. 5 shows a LED driver using a chip of Richtek Technology Corporation with the product number RT9271, as an example of the LED driver 18 depicted in FIG. 2. A LED string including D2, D3 and D4 as the LED array 20 is connected to the output $V_{OUT}$ of the LED driver 18. A high frequency clock signal CLK with a fixed duty is applied to a chip enabled input CE of the chip RT9271, thus allowing the LED driver 18 to generate a high frequency switching driving current $I_{LED}$ to drive the LEDs D2, D3 and D4. Operation of this LED driver is well known to persons skilled in the art, which includes a PWM current control loop and a power switch thereof, and the chip RT9271 turns on and off the driving current $I_{LED}$, under control of the clock signal CLK. Since the LED brightness is determined by the driving current $I_{LED}$ and the duty of the clock signal CLK, the LEDs D2, D3 and D4 will emit light having a fixed brightness but flashing at the frequency of the clock signal CLK.

As being illustrated by the above embodiments, this kind of flashing LED lighting makes insects nervous and drives insects away, while it is recognized as a constant brightness stable lighting by human eyes. Moreover, it is a very cost-effective way for driving away insects with special flashing pattern of LED.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A LED control circuit comprising a clock generator generating a clock signal having a duty according to a first signal and a frequency according to a second signal, supplied to a LED driver for driving a LED to emit light flashing at a modulated high frequency with a fixed duty.

2. The LED control circuit of claim 1, wherein the frequency of the flashing LED light varies above 60 Hz.

3. A LED control method, comprising the steps of:
   controlling a duty according to a first signal;
   controlling a frequency according to a second signal; and
   generating a clock signal according to the duty and frequency, to control a LED driving current, thereby allowing a LED to emit light flashing at a modulated high frequency and with a fixed duty.

4. The LED control method of claim 3, wherein the frequency of the flashing LED light is controlled by the second signal to vary above 60 Hz.

5. A LED control circuit, comprising:
   a first circuit generating a first current according to a first voltage;
   a second circuit generating a second current according to a second voltage;
   a capacitor being charged by the first current and discharged by the second current; and
   a third circuit generating a clock signal according to a voltage on the capacitor, to control a LED driving current, thereby allowing a LED to emit light flashing at a modulated high frequency and with a fixed duty.

6. The LED control circuit of claim 5, wherein the frequency of the flashing LED light varies above 60 Hz.

7. The LED control circuit of claim 5, wherein the first circuit comprises a transducer transforming the first voltage into the first current.

8. The LED control circuit of claim 5, wherein the second circuit comprises a transducer transforming the second voltage into the second current.

9. The LED control circuit of claim 5, wherein the third circuit comprises a hysteresis circuit triggered by the voltage on the capacitor to generate the clock signal.

10. A LED control method, comprising the steps of:
setting a flashing frequency range for a LED such that the LED emits light flashing at a frequency within the flashing frequency range which is not sensible to human eyes but sensible to a specific insect; and
driving the LED with a switching current having a flashing frequency varying with time within the flashing frequency range, and a fixed duty.

11. The LED control method of claim 10, wherein the flashing frequency range is above 60 Hz.

12. An LED control circuit, comprising:
a first circuit determining a total current according to a first signal;
a dividing circuit dividing the total current into a first current and a second current according to a second signal;
a capacitor being charged by the first current and discharged by the second current; and
a second circuit generating a clock signal according to a voltage on the capacitor, to control a LED driving current, thereby allowing a LED to emit light flashing at a modulated high frequency and with a fixed duty.

13. The LED control circuit of claim 12, wherein the frequency of the flashing LED light varies above 60 Hz.

14. The LED control circuit of claim 12, wherein the first circuit comprises a transducer transforming the first signal into the total current.

15. The LED control circuit of claim 12, wherein the second circuit comprises a hysteresis circuit triggered by the voltage on the capacitor to generate the clock signal.

16. A LED control method, comprising the steps of:
determining a total current according to a swing control signal;
dividing the total current into a first current and a second current according to a dimming control signal;
using the first current and second currents to charge and discharge a capacitor respectively; and
generating a clock signal according to a voltage on the capacitor, to control a LED driving current, thereby allowing a LED to emit light flashing at a modulated high frequency and with a fixed duty.

17. The LED control method of claim 16, wherein the frequency of the flashing LED light is controlled by the swing control signal to vary above 60 Hz.

18. A LED lamp for insect resistive, comprising:
a LED;
a LED driver providing a switching current for the LED; and
a clock generator generating a clock signal having a fixed duty and a variable clock frequency for the LED driver, thereby allowing the LED to emit light flashing at a modulated high frequency and with the fixed duty.

19. The LED lamp of claim 18, further comprising:
a duty controller determining the duty according to a dimming control signal; and
a frequency controller determining the clock frequency according to a swing control signal.

20. The LED lamp of claim 18, wherein the clock generator comprises:
a first transducer transforming a first voltage into a first current;
a second transducer transforming a second voltage into a second current;
a capacitor being charged by the first current and discharged by the second current; and
a hysteresis circuit generating a clock signal according to a voltage on the capacitor, to control a LED driving current, thereby allowing the LED to emit the light flashing at the modulated high frequency and with the fixed duty.

21. The LED lamp of claim 18, wherein the clock generator comprises:
a transducer transforming a swing control signal into a total current;
a dividing circuit dividing the total current into a first current and a second current according to a dimming control signal;
a capacitor being charged by the first current and discharged the second current; and
a hysteresis circuit generating a clock signal according to a voltage on the capacitor, to control a LED driving current, thereby allowing the LED to emit the light flashing at the modulated high frequency and with the fixed duty.

22. The LED lamp of claim 18, wherein the frequency of the flashing LED light varies above 60 Hz.

* * * * *